United States Patent
Reddick et al.

(10) Patent No.: US 9,845,577 B2
(45) Date of Patent: *Dec. 19, 2017

(54) FILLER FOR ARTIFICIAL TURF SYSTEM

(71) Applicant: USGREENTECH, L.L.C., Cincinnati, OH (US)

(72) Inventors: Randolph S. Reddick, Calhoun, GA (US); Carl L Huff, Reagan, TX (US)

(73) Assignee: USGreentech, L.L.C., Newtown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,517

(22) Filed: Aug. 3, 2016

(65) Prior Publication Data

US 2016/0362850 A1    Dec. 15, 2016

Related U.S. Application Data

(60) Continuation of application No. 14/521,979, filed on Oct. 23, 2014, which is a continuation of application
(Continued)

(51) Int. Cl.
*E01C 13/08*    (2006.01)
*B32B 5/16*    (2006.01)
(Continued)

(52) U.S. Cl.
CPC .............. *E01C 13/08* (2013.01); *C03C 3/04* (2013.01); *D06N 7/0065* (2013.01);
(Continued)

(58) Field of Classification Search
CPC .................... E01C 13/08; C03C 3/04
(Continued)

(56) References Cited

U.S. PATENT DOCUMENTS 2,106,317 A    1/1938    Dezendorf
2,695,851 A    11/1954    Lodge
(Continued)

FOREIGN PATENT DOCUMENTS

DE    19540623 A1    5/1997
EP    377925 A1    7/1990
(Continued)

OTHER PUBLICATIONS

"Advantage Sport Coating Products", Brochure by Van Bros. Inc.
(Continued)

*Primary Examiner* — Cheryl Juska
(74) *Attorney, Agent, or Firm* — Wood Herron & Evans LLP

(57) ABSTRACT

Artificial turf for use with an artificial turf system, which may also include a base layer and a support layer. The artificial turf comprising a backing supporting pile tufts of between ¼" to 4" in length, in position on its upper surface. The backing may comprise a porous synthetic foam or backing sheet. A filler of particles shaped to have no sharp edges and of substantially equal size are interspersed over the backing and about the tufts up to at least half thick length. The artificial turf substantially retains its resiliency, porosity and equal density throughout.

9 Claims, 7 Drawing Sheets

Related U.S. Application Data

No. 12/980,149, filed on Dec. 28, 2010, which is a division of application No. 11/713,891, filed on Mar. 5, 2007, now Pat. No. 7,858,148, which is a continuation-in-part of application No. 11/373,885, filed on Mar. 13, 2006, now Pat. No. 8,263,203, which is a continuation-in-part of application No. 10/811,737, filed on Mar. 29, 2004, now Pat. No. 7,144,609, which is a continuation-in-part of application No. 10/422,129, filed on Apr. 24, 2003, now Pat. No. 6,884,509.

(51) Int. Cl.
 *D06N 7/00* (2006.01)
 *C03C 3/04* (2006.01)

(52) U.S. Cl.
 CPC ... *D06N 7/0068* (2013.01); *D06N 2201/0254* (2013.01); *D06N 2201/0263* (2013.01); *D06N 2203/042* (2013.01); *D06N 2203/068* (2013.01); *D06N 2205/023* (2013.01); *D06N 2205/04* (2013.01); *D06N 2205/10* (2013.01); *D06N 2209/0823* (2013.01); *D06N 2213/063* (2013.01); *Y10T 428/23921* (2015.04); *Y10T 428/23979* (2015.04); *Y10T 428/2991* (2015.01); *Y10T 428/2993* (2015.01); *Y10T 428/2996* (2015.01); *Y10T 428/2998* (2015.01)

(58) Field of Classification Search
 USPC .............................. 428/87, 17, 403, 404, 407
 See application file for complete search history.

(56) References Cited

U.S. PATENT DOCUMENTS

| | | |
|---|---|---|
| 2,700,003 A | 1/1955 | Gundlach |
| 2,934,455 A | 4/1960 | Dober |
| 3,003,643 A | 10/1961 | Thomas |
| 3,079,209 A | 2/1963 | Boggus |
| 3,092,836 A | 6/1963 | Boggus |
| 3,099,574 A | 7/1963 | Bernier |
| 3,441,362 A | 4/1969 | Streck |
| 3,443,492 A | 5/1969 | Pleass |
| 3,503,771 A | 3/1970 | Kroyer |
| 3,513,061 A | 5/1970 | Vinicki |
| 3,513,062 A | 5/1970 | Vinicki |
| 3,557,038 A | 1/1971 | Gebura |
| 3,795,180 A | 3/1974 | Larsen |
| 3,917,771 A | 11/1975 | Basile |
| 4,188,154 A | 2/1980 | Izatt |
| 4,268,551 A | 5/1981 | Moore, Jr. |
| 4,356,220 A | 10/1982 | Benedyk |
| 4,412,015 A | 10/1983 | Lustgarten et al. |
| 4,462,184 A | 7/1984 | Cunningham |
| 4,497,853 A | 2/1985 | Tomarin |
| 4,606,963 A | 8/1986 | Farrell |
| 4,749,479 A | 6/1988 | Gray |
| 4,750,909 A | 6/1988 | Streck |
| 4,792,133 A | 12/1988 | Hawkins et al. |
| 4,913,596 A | 4/1990 | Lambert, III |
| 4,934,865 A | 6/1990 | Varkonyi et al. |
| 4,968,024 A | 11/1990 | Hawkins |
| 5,017,040 A | 5/1991 | Mott |
| 5,041,320 A | 8/1991 | Meredith et al. |
| 5,064,308 A | 11/1991 | Almond et al. |
| 5,076,726 A | 12/1991 | Heath |
| 5,151,123 A | 9/1992 | Kviesitis |
| 5,250,340 A | 10/1993 | Bohnhoff |
| 5,254,364 A | 10/1993 | Kviesitis |
| 5,262,453 A | 11/1993 | Watanabe et al. |
| 5,264,029 A | 11/1993 | Kviesitis |
| 5,306,317 A | 4/1994 | Yoshizaki |
| 5,383,314 A | 1/1995 | Rothberg |
| 5,411,352 A | 5/1995 | Eren |
| 5,458,973 A | 10/1995 | Jeffs |
| 5,460,867 A | 10/1995 | Magnuson et al. |
| 5,538,165 A | 7/1996 | Frohn |
| 5,538,787 A | 7/1996 | Nachtman et al. |
| 5,583,165 A | 12/1996 | Kviesitis |
| 5,618,131 A | 4/1997 | Weber |
| 5,688,073 A | 11/1997 | Brodeur et al. |
| 5,752,784 A | 5/1998 | Motz et al. |
| 5,780,144 A | 7/1998 | Bradley |
| 5,820,296 A | 10/1998 | Goughnour |
| 5,823,711 A | 10/1998 | Herd et al. |
| 5,848,856 A | 12/1998 | Bohnhoff |
| 5,849,124 A | 12/1998 | Rusk, Jr. et al. |
| 5,908,673 A | 6/1999 | Muhlberger |
| 5,950,936 A | 9/1999 | Bergart |
| 5,958,527 A | 9/1999 | Prevost |
| 5,961,389 A | 10/1999 | Dickinson |
| 6,029,477 A | 2/2000 | Hanvey, Jr. |
| 6,168,102 B1 | 1/2001 | Bergart |
| 6,221,445 B1 | 4/2001 | Jones |
| 6,235,372 B1 | 5/2001 | Joedicke |
| 6,238,794 B1 | 5/2001 | Beesley et al. |
| 6,263,633 B1 | 7/2001 | Hagenah |
| 6,299,959 B1 | 10/2001 | Squires et al. |
| 6,338,871 B1 | 1/2002 | Shin |
| 6,338,885 B1 | 1/2002 | Prevost |
| 6,432,505 B1 | 8/2002 | Sweenie et al. |
| 6,443,996 B1 | 9/2002 | Mihelich et al. |
| 6,500,543 B2 | 12/2002 | Sakai |
| 6,551,689 B1 | 4/2003 | Prevost |
| 6,582,819 B2 | 6/2003 | McDaniel et al. |
| 6,610,405 B2 | 8/2003 | Iriguchi et al. |
| 6,630,530 B2 | 10/2003 | Han |
| 6,632,527 B1 | 10/2003 | McDaniel et al. |
| 6,645,627 B1 | 11/2003 | Rossi et al. |
| 6,689,447 B2 | 2/2004 | Prevost |
| 6,723,412 B2 | 4/2004 | Prevost |
| 6,740,387 B1 | 5/2004 | Lemieux |
| 6,746,752 B2 | 6/2004 | Prevost |
| 6,800,339 B2 | 10/2004 | Motz et al. |
| 6,805,936 B2 | 10/2004 | Seaton |
| 6,818,274 B1 | 11/2004 | Buck et al. |
| 6,818,300 B2 | 11/2004 | Loyd et al. |
| 6,877,932 B2 | 4/2005 | Prevost |
| 6,884,509 B2 | 4/2005 | Huff et al. |
| 6,946,181 B2 | 9/2005 | Prevost |
| 7,144,609 B2 | 12/2006 | Reddick |
| 7,153,553 B2 | 12/2006 | Tetrault |
| 7,166,340 B1 | 1/2007 | Clark |
| 7,300,689 B2 | 11/2007 | Prevost |
| 7,306,838 B2 | 12/2007 | Prevost |
| 8,795,834 B2 * | 8/2014 | Tetrault .................. E01C 13/08 428/17 |
| 9,540,777 B1 * | 1/2017 | Tetrault .................. E01C 13/08 |
| 2002/0006481 A1 | 1/2002 | Morris |
| 2003/0039511 A1 | 2/2003 | Prevost |
| 2003/0118755 A1 | 6/2003 | Motz et al. |
| 2003/0161996 A1 | 8/2003 | Prevost |
| 2003/0175448 A1 | 9/2003 | Prevost |
| 2003/0182855 A1 | 10/2003 | Prevost |
| 2004/0028841 A1 | 2/2004 | Motz et al. |
| 2004/0086664 A1 | 5/2004 | Seaton |
| 2004/0214000 A1 | 10/2004 | Huff et al. |
| 2004/0229007 A1 | 11/2004 | Motz et al. |
| 2005/0003193 A1 | 1/2005 | Stroppiana |
| 2005/0031803 A1 | 2/2005 | Prevost |
| 2005/0042032 A1 | 2/2005 | Motz et al. |
| 2006/0100342 A1 | 5/2006 | Jensen |
| 2006/0121236 A1 | 6/2006 | Prevost |
| 2006/0134374 A1 | 6/2006 | Bell et al. |
| 2006/0147670 A1 | 7/2006 | Reddick |
| 2007/0160800 A1 | 7/2007 | Reddick |
| 2007/0254131 A1 | 11/2007 | Shail et al. |
| 2008/0050516 A1 | 2/2008 | Dickinson |
| 2008/0141516 A1 | 6/2008 | Julicher et al. |
| 2008/0145574 A1 | 6/2008 | Julicher et al. |
| 2008/0176009 A1 | 7/2008 | Chereau et al. |
| 2008/0182040 A1 | 7/2008 | Chereau et al. |

(56) References Cited

U.S. PATENT DOCUMENTS

| | | |
|---|---|---|
| 2008/0268184 A1 | 10/2008 | Cook |
| 2009/0011845 A1 | 1/2009 | Weber et al. |
| 2009/0011873 A1 | 1/2009 | Weber et al. |
| 2009/0162578 A1 | 6/2009 | Van Balen et al. |
| 2009/0208674 A1 | 8/2009 | Murphy et al. |
| 2009/0226646 A1 | 9/2009 | Dlubak et al. |
| 2010/0015448 A1 | 1/2010 | Huff et al. |
| 2010/0055461 A1 | 3/2010 | Daluise et al. |
| 2010/0239790 A1* | 9/2010 | Stricklen ................ E01C 13/08 428/17 |
| 2012/0258811 A1* | 10/2012 | Tetrault ................ E01C 13/08 472/92 |
| 2014/0154432 A1* | 6/2014 | Packer .................... D06Q 1/12 428/17 |
| 2014/0322459 A1* | 10/2014 | Tetrault ................ E01C 13/08 428/17 |

FOREIGN PATENT DOCUMENTS

| | | |
|---|---|---|
| JP | 05171611 A | 7/1993 |
| JP | 2003171908 A | 6/2003 |
| KR | 754961 B1 | 9/2007 |
| WO | 03042293 A1 | 5/2003 |
| WO | 2004022853 A1 | 3/2004 |
| WO | 2004056881 A1 | 7/2004 |

OTHER PUBLICATIONS

"Aggregate Filled Acrylic Color System Product Specifications", Brochure by Latexite.
"Angle of Repose of Soils," landscapeinfoguide.com.au, undated.
English translation of JP5171611 in the name of Sekisui Chemical Co., Ltd., published Jul. 9, 1993.
English translation of KR754961 in the name of Jong Moon Kim et al., published Sep. 7, 2007.
"FieldTurf Launches Fire-Retardant Infill and Fiber Synthetic Turf Components," http://www.pr.com/press-release/373434, Dec. 2, 2011.
JPO machine translation of JP 05-171611 A (1993).
JPO machine translation of JP 2003-171908 A (2003).
Latex-Ite, "Aggregate Filled Acrylic Color System Product Specifications", brochure, 1997, 3 pp.
"Material Safety Data Sheet" brochure, Jan. 15, 2003, 2 pp.
Office Action in related U.S. Appl. No. 10/422,129, dated Jan. 12, 2005, 8 pp.
Office Action in related U.S. Appl. No. 10/422,129, dated Oct. 4, 2004, 8 pp.
Office Action in related U.S. Appl. No. 10/811,737, dated Feb. 3, 2006, 14 pp.
Office Action in related U.S. Appl. No. 10/811,737, dated Jul. 25, 2006, 11 pp.
Office Action in related U.S. Appl. No. 10/811,737, dated May 9, 2006, 8 pp.
Office Action in related U.S. Appl. No. 11/373,885, dated Dec. 24, 2009, 9pp.
Office Action in related U.S. Appl. No. 11/373,885, dated Jan. 3, 2011, 11pp.
Office Action in related U.S. Appl. No. 11/373,885, dated Mar. 16, 2011, 3pp.
Office Action in related U.S. Appl. No. 11/373,885, dated Mar. 3, 2009, 15 pp.
Office Action in related U.S. Appl. No. 11/373,885, dated Mar. 3, 2010, 3pp.
Office Action in related U.S. Appl. No. 11/373,885, dated Mar. 31, 2008, 13pp.
Office Action in related U.S. Appl. No. 11/373,885, dated May 25, 2010, 11pp.
Office Action in related U.S. Appl. No. 11/373,885, dated Sep. 18, 2008, 12 pp.
Office Action in related U.S. Appl. No. 11/713,891, dated Aug. 25, 2010, 9pp.
Office Action in related U.S. Appl. No. 11/713,891, dated Dec. 29, 2009, 11pp.
Office Action in related U.S. Appl. No. 11/713,891, dated Jul. 27, 2010, 3pp.
Office Action in related U.S. Appl. No. 11/713,891, dated Jun. 17, 2009, 3pp.
Office Action in related U.S. Appl. No. 11/713,891, dated May 13, 2009, 16pp.
Office Action in related U.S. Appl. No. 11/713,891, dated May 24, 2010, 12pp.
Office Action in related U.S. Appl. No. 11/713,891, dated Oct. 8, 2008, 10pp.
Office Action in related U.S. Appl. No. 12/567,223, dated Mar. 2, 2011, 10pp.
Office Action in related U.S. Appl. No. 12/567,223, dated Oct. 14, 2010, 8pp.
Reddick Declaration, plus accompanying Exhibits A-AA.
Three sheets alleged to support the "On sale" allegation, dated Sep. 1, 2001, Aug. 21, 2000, and Sep. 5, 2000.
Vance Bros. Inc., "Advantage Sport Coating Products" brochure, 3 pp.
Letter from Tyler Barrett, Esq. to Thomas J. Burger, Esq., dated Dec. 11, 2014, 2 pp.
Letter from Tyler Barrett, Esq. to Thomas J. Burger, Esq., dated Jan. 19, 2015, 2 pp.
Email from Tyler Barrett, Esq. to Thomas J. Burger, Esq., dated May 15, 2015, 1 p.

* cited by examiner

FILLER FOR ARTIFICIAL TURF SYSTEM

CROSS REFERENCE TO RELATED APPLICATIONS

This application is a Continuation-in-Part of application Ser. No. 14/521,979, filed Oct. 23, 2014 (now abandoned), which is a Continuation-in-Part of application Ser. No. 12/980,149, filed Dec. 28, 2010 (now abandoned), which is a Divisional of application Ser. No. 11/713,891, filed Mar. 5, 2007, now U.S. Pat. No. 7,858,148, which is a Continuation-in-Part of application Ser. No. 11/373,885 filed Mar. 13, 2006, now U.S. Pat. No. 8,263,203, which is a Continuation-In-Part of application Ser. No. 10/811,737 filed Mar. 29, 2004, now U.S. Pat. No. 7,144,609 B2, which is a Continuation-In-Part of application Ser. No. 10/422,129, filed Apr. 24, 2003, now U.S. Pat. No. 6,884,509 the subject matters of which are incorporated herewith.

BACKGROUND OF THE INVENTION

Artificial turf systems are old and well-known. The original systems had the problem of losing their resiliency over a substantially short period of time, after which they became unsatisfactory for certain uses. Another factor which creates problems is that certain fillers are not fireproof, and in fact, will burn, which creates a fire hazard. Finally, certain fillers contain dust and when used indoors, tend to pollute the atmosphere.

Accordingly, it is an object of the instant invention to provide a filler for use with an artificial turf system which will allow the system to be evenly resilient throughout.

Another object of the instant invention is to provide a filler for use with an artificial turf system which retains its resiliency over an extended period.

Another object of the invention is the provision of a filler which does not pack or mound.

Another object of the invention is the provision of a hypdrophobic filler.

Another object of the invention is the provision of a hydrophobic filler which will not harbor bacteria.

Another object of the invention is the provision of a hydrophobic filler which may be recycled into other objects.

Another object of the invention is a filler which contains no sharp edges and can be of substantially evenly sized particles or varying sized particles.

Another object of the invention is the provision of a filler which is non-flammable, dust free, non-absorbent and recyclable.

Another object of the invention is a filler which is formed from waste glass or recycled glass granules.

Another object of the invention is a filler which maintains low G-max after extended use.

Another object of the invention is an artificial turf system with improved safety.

SUMMARY OF THE INVENTION

The instant invention is directed to a filler for use in an artificial turf system which may include a support layer, a base layer, and an outer layer. The support layer comprises an area of selected size which may consist of smoothed sand, compacted soil, fiber reinforced soil, gravel, asphalt, concrete or a combination thereof.

The base layer comprises at least one grid which consists of a plurality of interconnected cells arranged over and supported by the support layer. Each cell of the cells forming the grid comprises an upstanding tubular member having an upper portion of a first diameter, which functions to support the outer layer, and a lower portion of a second diameter, which functions to engage with the support layer. The lower portion provides the cell with vertical flexibility, which provides the artificial turf system with vertical movement during use. This vertical movement improves the ability of the turf system to absorb downward forces or impacts.

The outer layer includes pile secured with a backing fabric which is preferably supported on the transition layer. The pile may also be secured with a foam backing which may be supported directly on the upper surface of the mat. A filler is spread evenly over the pile fabric to cover the surface of the backing fabric and to surround and cover desired portions of the pile tufts. It is preferred that the filler is STF (coated silicon dioxide particles) or glass beads. The fillers may be combined with ground rubber or sand.

As stated in the related '509 patent, directed to the initial silicon dioxide embodiment, the invention is directed to an aggregate turf filler for use with the turf of athletic fields and landscaped areas. The turf may be natural or artificial. The turf filler is composed of: silica sand particles ($SiO_2$) which are substantially round in shape and are sized to be between 12 and 40 mesh. The particles are coated with an acrylic sealer which seals the outer surface of each of the silica sand particles. So treated the silica sand particles possess an angle of repose of less than 30°, repel water, resist compacting, present no damaging sharp edges when incorporated with the turf and are environmentally safe. The silica sand particles are sized to be within no more than five mesh sizes.

The pile tufts extending from the backing fabric are between ¼" to 4" in length and preferably formed of synthetic ribbons of between about 1/32" to 3/8" in width. The backing fabric is preferably formed of porous synthetic material which secures the pile tufts in fixed positions.

A preferred filler comprises substantially equal size glass beads formed of molten particles of crushed glass, referred to as cullet, or from glass dust or dust particles created during the glass crushing operation. The filler is interspersed over the backing fabric to fill around or about the tufts up to at least half their length. The glass beads may be polished. The glass beads are selectively sized to maintain an angle of repose of more than 25 which maintains porosity through the filler.

The glass beads may be colored one of brown, green, red, and black. They may comprise a combination of these colors or they may be natural color. The silicon dioxide and glass beads range in size between 6 and 80 mesh. The glass beads are substantially round and have no sharp edges. The glass beads are sized to be within about five mesh sizes and are spread over the pile tufts evenly to a depth of between 0.25" to 2.00." The glass beads are arranged over the backing at between 1 pounds and 6 pounds per square foot. The glass beads have a specific gravity of between 1.00-2.50.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
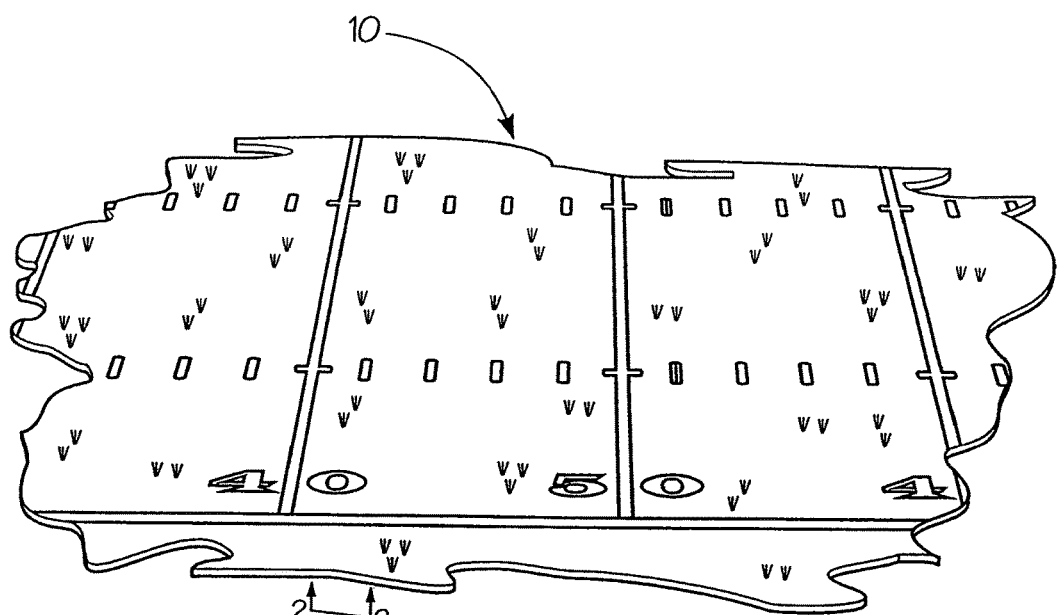
FIG. 1 is a perspective view of a sports field employing artificial turf.

The artificial turf system is designed to be usable for many different purposes such as sports surfaces, landscaping, equine facilities and the like. The sports surface illustrated in FIG. 1 is a ball field. The arrangement is equally adaptable as playgrounds, putting greens and track facilities. In order to function in these areas, the artificial turf system must be of proper firmness, be durable, have proper drainage capability, and be easily installed. In the case of sport and equine facilities, it is also necessary that the turf system have proper abrasiveness, traction, flame retardance and not present fungicidal problems. It is also most necessary that the field maintain an even surface and not pack or mound unnecessarily.

Turning now to FIGS. 2-5, an artificial turf system of the invention is shown broken into three components, i.e. outer layer A, base layer B and support layer C.

Support layer C may be no more than compacted soil or it may be comprised of crushed stone, crushed stone and sand, asphalt, concrete or a combination thereof. This layer is identified as support base 12.

It may be desirable to place a stabilizer sheet 14 over base 12. Stabilizer sheet 14 is a flexible non-porous plastic sheet which assists with drainage and provides a stabilizing support for grid system 16.

Base layer B is positioned over and is supported on support layer C. Base layer B includes a mat which is made up of a plurality of grids 16 connected together. The mat is preferably formed to conform with the shape of support layer C. There could be a plurality of mats laid side-by-side over an extremely large support layer.

Each grid 16 is formed of a plurality of interconnected cells 18 which comprise cylinders formed of semi-rigid or semi-flexible plastic. Grids 16 are preferably formed in rectangular or square segments, however, any polygonal shape is acceptable. Cells 18 are more fully described in co-pending application Ser. No. 10/811,737 earlier referred to.

Upper section 20 of each cell 18 has an upper end 21 which is generally designed to engage with outer layer A. Vents 23 are formed about the periphery of the upper section to allow hot air to exit the cylinder.

Lower section 22 of each cell 18 extends radially downward and outward from the lower end of upper section 20 forming a cone-shaped lower section. Lower section 22 extends from the vertical axis of the cell at an angle of about 75. Lower section 22 may have a continuous radial surface or it may be in the form of a plurality of radially extending members. In either instance, lower section 22 provides resilience or movement of a cell in the vertical direction when it is impacted with weight. The degree of downward movement from its normal height x to a compressed height y or between 1/16" and 1/8."

Cylinders 18 preferably extend vertically to about 1" in height with the upper portion being bout 3/4" and the lower portion about 1/4."

Grids 16 comprise a plurality of cells 18 which are interconnected by securing members. The securing members engage with the adjacent cell peripheries, preferably the lower edge of lower section 22. The cells forming a grid are arranged along opposed axes with each axis being separated by about 4."

The securing members are generally diamond shaped and comprise flexible synthetic filaments or rods interconnected to allow vertical, diagonal and horizontal movement between the adjacent cells. This flexibility allows the cells forming the grids to conform with the topography of the support layer, insuring even engagement between each cell and the support layer.

In use, grids 16 which may also be integrally formed, preferably by molding, are interconnected forming mat 16 or a plurality of mats which then are placed over support layer C. The lower ends of lower portions 22 are positioned in engagement with support layer 12 or with stabilizer sheet 14.

Figure 4:
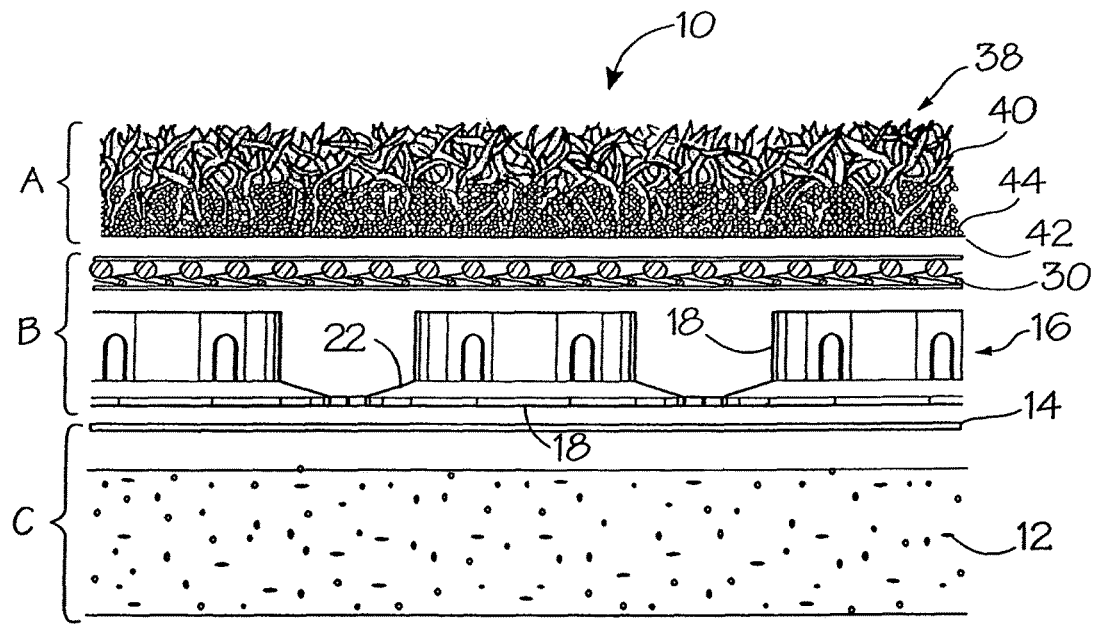
FIG. 4 is an exploded cutaway side view of a first arrangement of the artificial turf system of the invention.
Figure 6:
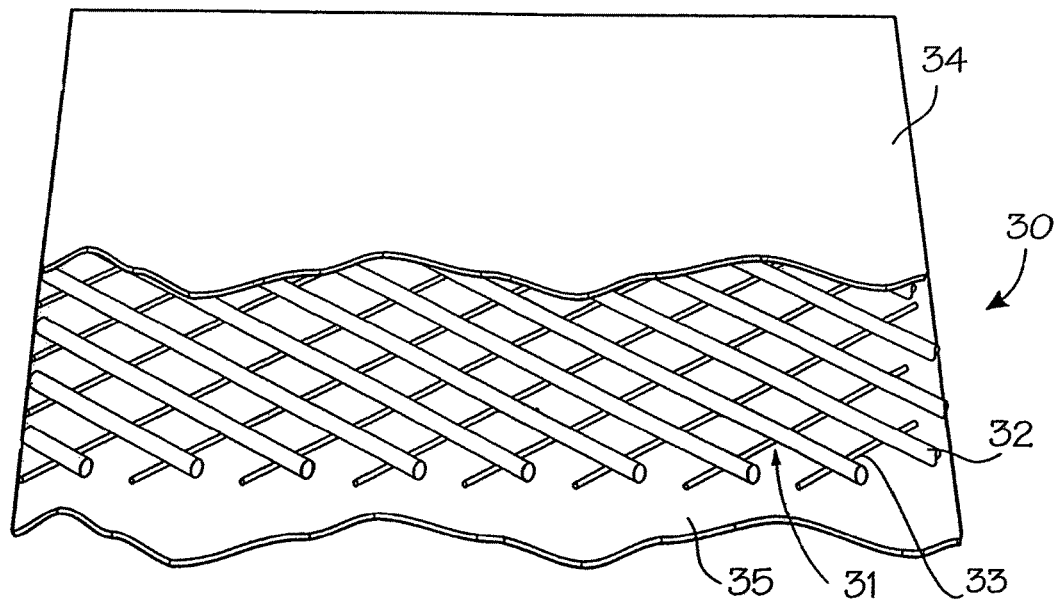
FIG. 6 is a sectional view of the transition layer.

In certain instances, base layer B includes a transition layer 30 as best shown in FIGS. 4 and 6. Transition layer 30 preferably consists of a screen or grate 31 which is formed of diagonally disposed semi-rigid synthetic rods or filaments 32, 33 having a diameter of between 1 mm and 6 mm. Generally rods 32 are of larger diameter than rods 33, however, this is not necessarily so. Preferably, the rods are formed of polyethylene. It is preferred that screen 31 be a unitary molded unit sized to match the grid size. They could be made in larger sheets and cut to size. Also they could be synthetic filaments bonded together. It is only necessary that screen 31 be sufficiently rigid to assist the cells in supporting the outer layer and yet provide sufficient vertical give to improve the resilience against impact of the artificial turf system.

Preferably felts 34, 35, which are formed of synthetic yarns, are positioned to be secured with the top and bottom surfaces of screen 31. Felts 34, 35 are formed to be between 4 and 10 ounces per square yard. The felts must be sufficiently porous to provide drainage from the outer layer through the base layer. The transition layer primarily assists in providing uniform vertical support of the outer layer while the felts provide padding which assists in reducing wear between the outer layer and the tops of the coils.

Figure 2:
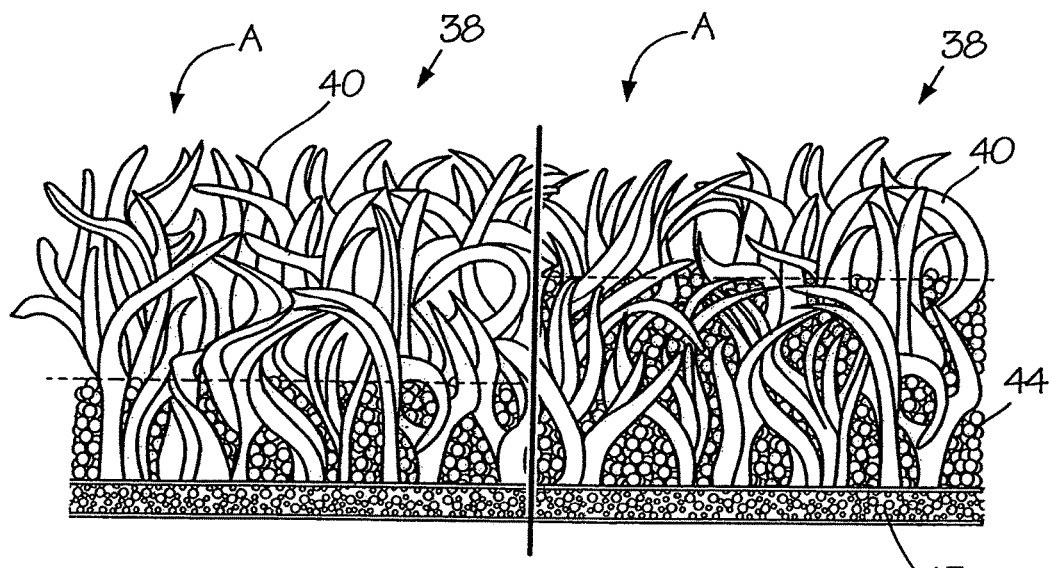
FIG. 2 is an exploded cutaway side view of a first arrangement of the filler in use with an artificial turf system of the invention.
Figure 3:
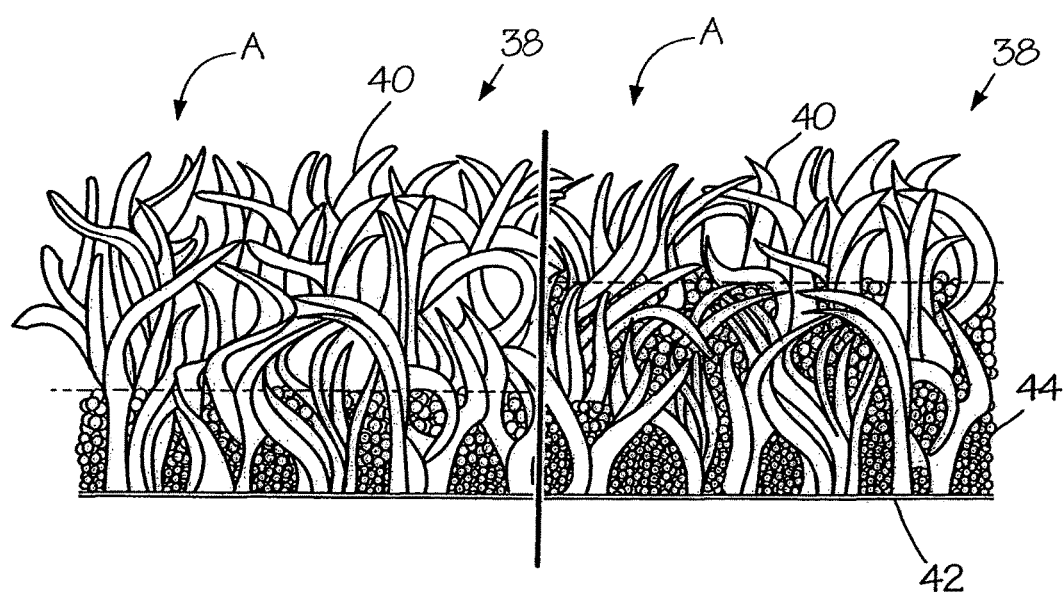
FIG. 3 is similar to FIG. 2, showing a second arrangement of the filler in use with a turf system of the invention.

Turning now to FIGS. 2 and 3, outer layer A comprises a pile fabric 38 which consists of pile tufts 40 secured with backing 42, 43.

Pile tufts 40 are preferably formed of polyethylene, polypropylene, nylon or a combination. The tuft forming synthetic filaments have a ribbon-like cross-section of between about 1/32" to 3/8" in width. The pile tufts are formed to a height, which may be uniform or may vary, of between 1/4"

to 4." The pile tufts are secured with backing fabric 42, 43 by tufting, weaving, braiding or bonding as desired.

Figure 5:
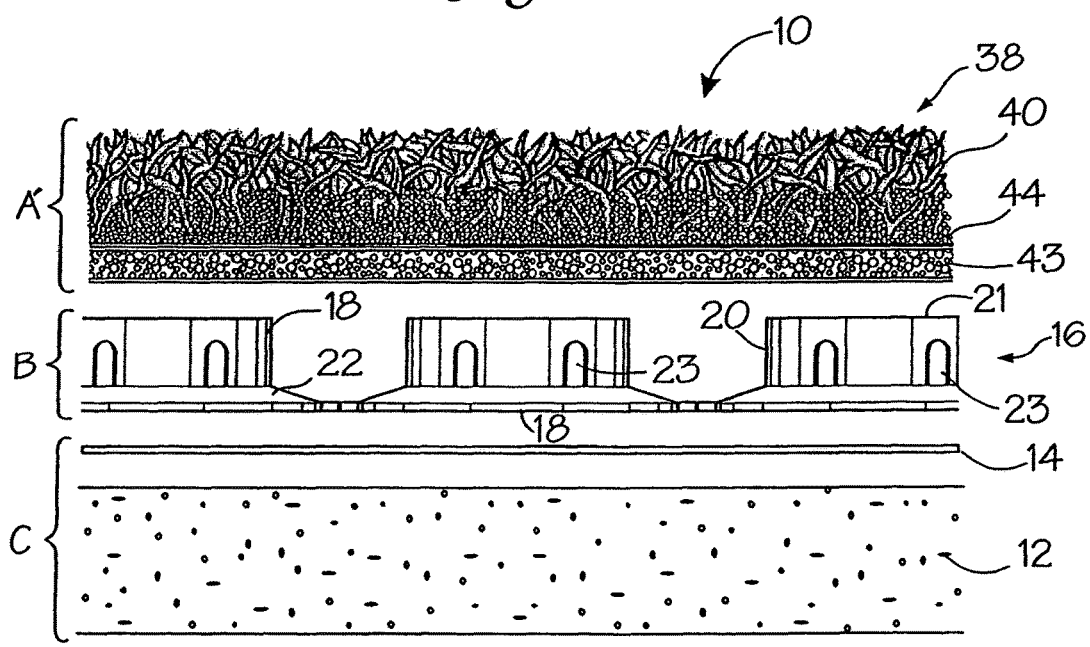
FIG. 5 is similar to FIG. 4 showing a second arrangement the artificial turf system of the invention.

The backing is preferably a porous textile fabric as shown at 42. When the fabric is employed to retain the tufts, it is desirable that transition layer 30, as shown in FIGS. 4 and 6, be positioned between the backing fabric and grid 16 or support layer C, so that backing fabric 42 is supported on the transition layer. Alternatively, the backing may comprise a ½" composite foam and fabric sheet 43 as shown in FIGS. 2 and 5. Backing 43 is preferably a polyurethane, polyethylene or latex sheet between 1 cm and 2 cm thick. When using backing 43, it is normally not necessary to provide transition layer 30 as backing 43 provides sufficient support or vertical resilience. In both instances, it is desirable that the backing material be porous.

A filler 44 is distributed evenly over backing 42, 43 and about pile tufts 40. In FIG. 2, filler 44 comprises evenly sized beads while in FIG. 3, filler 44 comprises variable sized beads. The filler is applied to a depth of between 0.25" to 2.00" depending upon the need. It is noted that the smaller size beads always work to the bottom, which results in the area adjacent the backing being less porous, which causes uneven drainage. This is why size control is so important.

Figure 7:
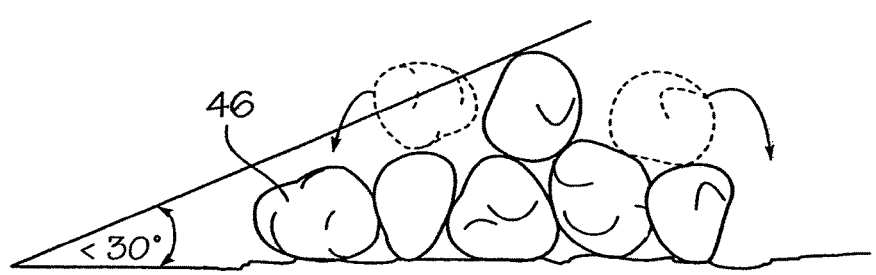
FIG. 7 is a cutaway side view of the angle of repose of the silicon dioxide beads.
Figure 9:
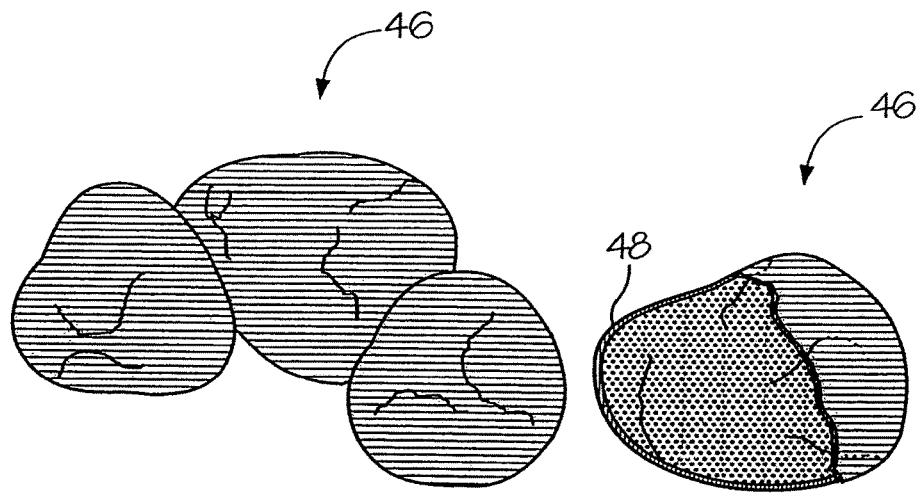
FIG. 9 is an exploded view of the coated silicon dioxide beads of the invention.

It has been found that a filler of silicon dioxide beads or particles, coated to have a non-porous outer surface as shown in FIGS. 7 and 9, are very desirable. These beads or particles are substantially rounded with no sharp edges. They are sized and cleaned, prior to coating, to be between 8 and 60 mesh and are substantially dust free. Due to the roundness of the particles of silicon dioxide and the restricted size range, this filler does not pill or mound and maintains an angle of repose of about 30° as shown in FIG. 7. This feature, while maintaining an even surface, assists tremendously in maintaining even porosity and a constant G-force factor.

As stated in the related '509 patent, granules of silica sand are somewhat porous. In order to eliminate this feature and also to provide the granules, or beads, with an outer surface which is both water proof and very slick it is desirable that the granules be coated with an acrylic polymer based waterproofing sealer. The coating of choice comprises mineral spirits, xylene, ethylbenzene and acrylic polymer. The acrylic polymer based sealer is clear and therefore, the granules may still have their natural appearance after coating. FIG. 9 shows a cutaway of a coated granule of silica sand. The coating further acts to remove rough edges which may occur over the surface of the particles.

It has also been found that it may be desirable to color the silica sand for a desired aesthetic effect. The colorant of choice is natural pigment in order to ensure that the filler not be a health hazard. Desired colorants for coloring the silica sand is iron oxide ($FeO_2$) for black and chromium (III) oxide ($Cr_2O_3$) for green. Other natural colorants and blends thereof are available should other colors be desired. It has been found, however, that black is the color which most enhances artificial turf or natural turf.

In order to prepare the pigment for application with the silica sand the sealant, is first mixed with the clear acrylic based sealant. The desired ratio for obtaining a mid-range hue is one part colorant to two parts sealer. This ratio may be adjusted to include more or less colorant in order to obtain the desired color depth.

Other substances may be combined with the silicon dioxide beads or particles during treating and tumbling, depending upon the desired use, texture, odor and color of the beads. These substances include natural or synthetic rubber, various plastic polymers, silver ions or nitrate, various fragrances, ultraviolet stabilizers, color pigment, ultraviolet stabilizers, a coolant and combinations of the above.

The silicon dioxide beads, after being coated with an acrylic polymer, have a hardness of at least six on the Mohs scale and provide permanent low G-max levels in the artificial turf system.

The silicon beads are formed normally with a natural color. It may also be desirable to color the silicon beads to enhance the appearance of the artificial turf. Desirable colorants are iron oxide for black and chromium (III) oxide ($Cr_2O_3$) for green. Other natural colorants are available for other colors or shades.

Figure 8:
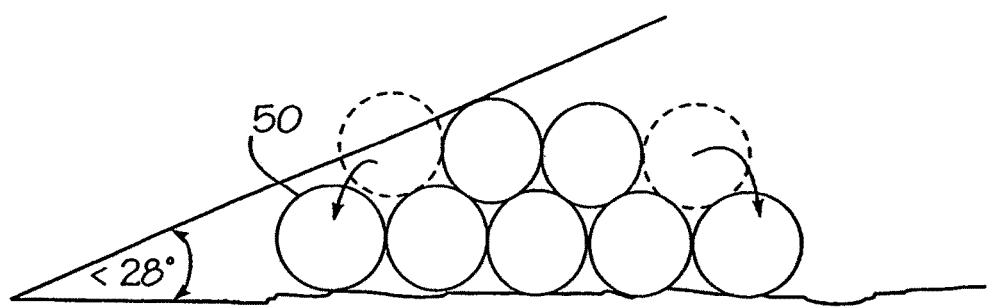
FIG. 8 is a cutaway side view of the angle of repose of the glass beads.
Figure 10:
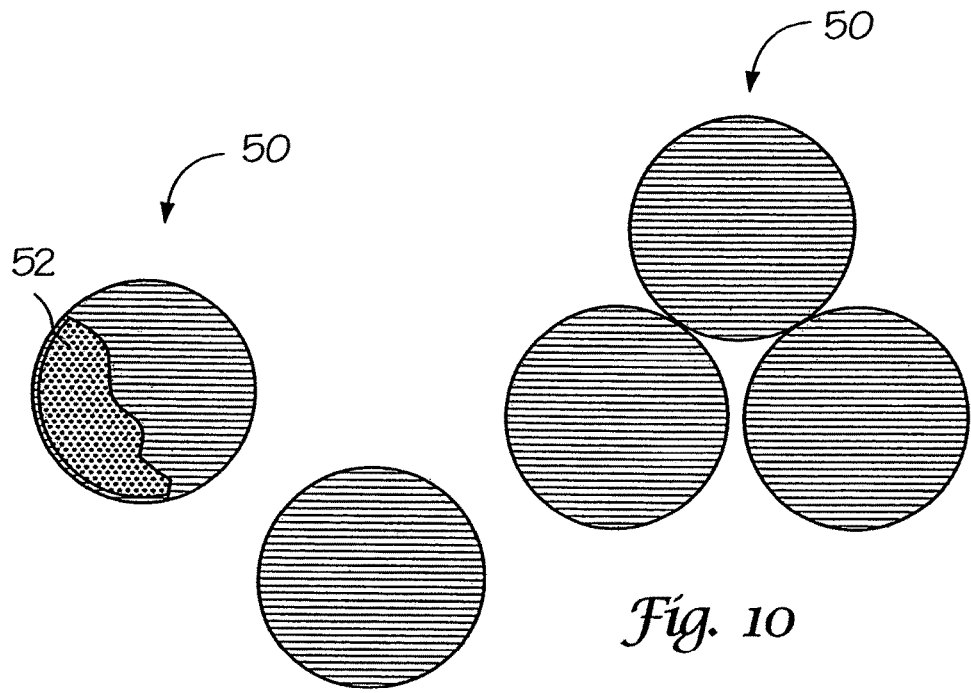
FIG. 10 is an exploded view of the glass beads of the invention.
Figure 11:
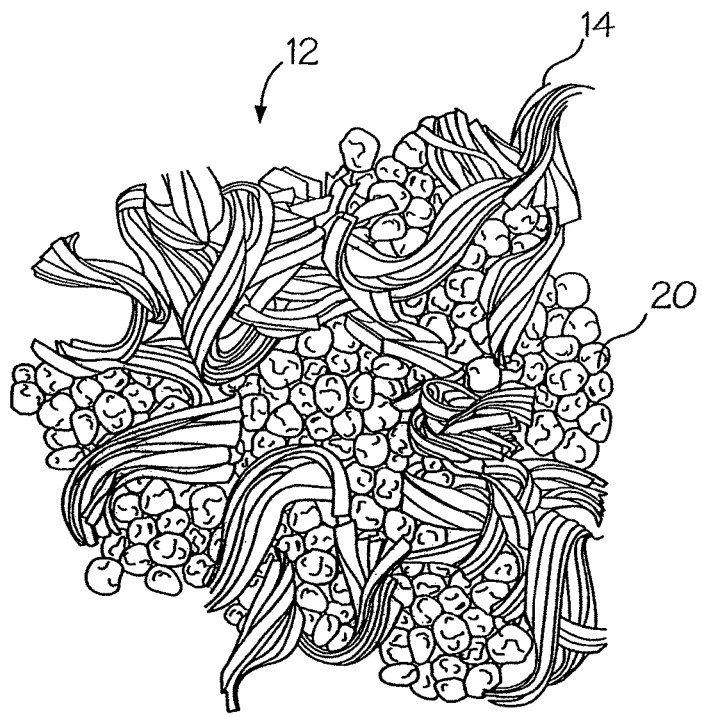
FIG. 11 is a top sectional view of the silicon dioxide beads surrounding and supporting pile tufts.
Figure 12:
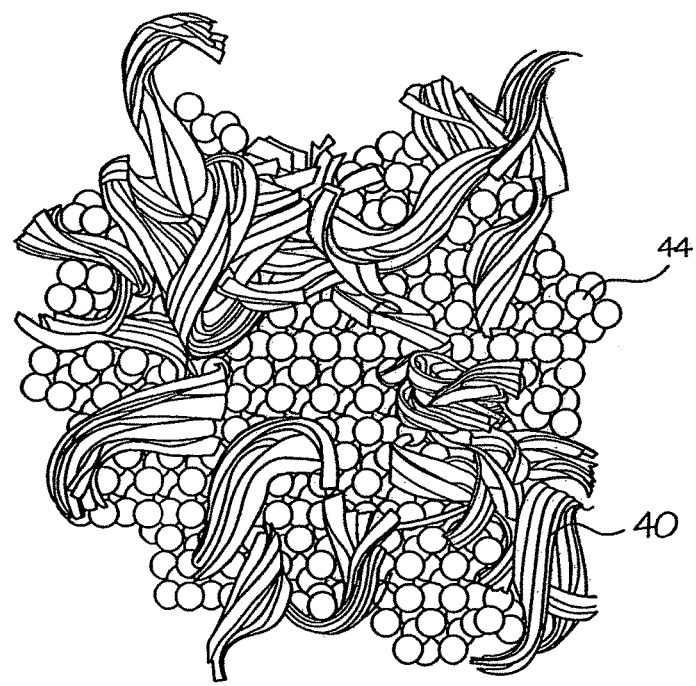
FIG. 12 is similar to FIG. 11 showing the glass beads surrounding and supporting pile tufts.

An equally desirable filler is one utilizing glass beads 50 as shown in FIGS. 8 and 10, which provide an excellent improvement over the current standard fillers, i.e. sand and recycled rubber. Glass beads are affordable, they are clean, they do not produce dust, they are on-porous, they do not burn and they do not maintain moisture. Therefore, they do not harbor bacteria. Furthermore, glass beads may be recycled back into glass and reformed for other uses.

It is preferred that discarded glass or glass waste be used to form the glass beads. Glass in this form is called "cullet." Normally, the cullet is first crushed, forming glass granules and glass dust. The granules are generally formed to a size of between 6 and 80 mesh with a specific gravity of 2.50+. The glass dust comprises extremely fine glass particles, ranging between 80 to 300 mesh, with each particle having a specific gravity of at least 1.00+.

The processed or crushed granules are passed through screens of selected sizes which isolates the granules into generally equal sized groups. The preferred size is between 0.25 mm and 5 mm or between 8 and 60 mesh. The sized groups of granules are then individually heated until the granules are in a slightly less than molten state. The almost molten granules are tumbled until they form glass beads which are round and have no sharp edges.

The crushed glass dust or particles have been formed into minute sizes, which range between 80 and 300 mesh. The glass dust or particles are formed into beads by heating the glass particles until they are slightly less than molten and tumbling the heated glass particles until beads which have no sharp edges and are between 6 and 80 mesh are formed.

In the case of forming beads from glass dust, it is noted that waste polymer products such as waste polypropylene filaments, polyethylene filaments or nylon filaments may be combined with the glass dust during heating and tumbling. The waste polymers adhere with the glass dust particles, enlarging their size, changing their appearance and outer texture. The beads formed of the combination of glass and synthetic polymers are smooth, water proof, resist abrasion, and may be colored, dependent upon the polymers. The beads formed from the glass dust or particles or from the glass dust and waste synthetic polymers are formed to be between 6 and 80 mesh. The above polymers may also be utilized in the treatment of the crushed particles.

Other substances may be combined with the beads or particles during treating and tumbling, depending upon the desired use, texture, odor and color of the beads. These substances include natural or synthetic rubber, various plastic polymers, silver ions or nitrate, various fragrances, ultraviolet stabilizers, color pigment, ultraviolet stabilizers, a coolant and combinations of the above.

The processes for forming the glass beads, whether from crushed cullet or dust, are known and are employed by Viceroy Ceramics, Dlubak Glass and others.

Glass beads 50, whether formed from cullet or dust, may be coated with synthetic polymer 52 to enhance the smoothness and lower the co-efficient of friction of their outer surface. Polymer 52 may be of the group consisting of epoxy, acrylic, urethane or Teflon® (e.g., a polytetrafluoroethylene).

Due to their low co-efficient of friction and their smooth outer surface, glass beads 50 maintain an angle of repose of less than 28° as indicated in FIG. 8 which is slightly better than the angle of repose of the silicon dioxide beads. Glass beads 50, because they do not pill but retain such a slight angle of repose, provide a more continuous and equal drainage throughout than other known products such as rubber or sand.

The glass beads, even those coated with a synthetic polymer, have a hardness of at least six on the Mohs scale and provide permanent low G-max levels in the artificial turf system.

It is noted that satisfactory results have been achieved when using mixtures of silicon dioxide or glass beads mixed with ground rubber or with sand. The ratios are dependent upon the intended use and may be achieved by trial and error.

Artificial turf systems when installed must be sufficiently stable so as to maintain a generally even outer surface. These systems must also be resilient within limits so that the stability of the surface is sufficiently hard so as to provide positive footing and yet is sufficiently resilient to provide sufficient give so as to not cause undue injury.

There have been tests developed to determine the physical capabilities of artificial turf systems. An industry accepted test for determining the resiliency or shock absorbing capability of artificial turf is conducted by TSI, i.e. Testing Services Inc. of Dalton, Ga. TSI conducts tests which reveal the G-max of an artificial turf system when installed and the G-max of that system after extended time or use.

For an artificial turf system to be acceptable, the G-max must be and remain within the range of 90 to 120.

Tests conducted on the artificial turf systems, using the combinations of fillers or beads as above described, provided results indicating that the systems, as installed, possessed a G-max of about 100, and as such, are at a very acceptable level of hardness. Continued testing over time, which equates with extended use when installed, resulted in an initial increase in G-max of between 5 and 14%, and generally about 7% with the system using silicon dioxide beads 46. With the system using glass beads 50, the initial increase in G-max was generally about 5%. The synthetic turf systems of the invention substantially retained this G-max of between 5% and 7% through extended further testing. The G-max for the system, after extended use, using silicon dioxide beads 46 held a G-max of about 110, while the system using glass beads 50 held a G-max of about 100. A G-max of between 105 and 114 is most acceptable.

It is noted that silicon dioxide beads 46 or the glass beads 50 have been tested with synthetic turf systems other than the ones herein disclosed with equally impressive results as pertains to retention of G-max, porosity and angle of repose.

Other artificial turf systems using sand or ground rubber have also been tested by TSI. The results of these tests indicated an initial G-max of about 100. However, with continued testing over time, the G-max of these products showed a continuous increase of up to between 25% to 40%, well above the accepted limit. This increase in the G-max indicates that these tested turf systems, in a short space in time, would degrade to the point of becoming unsatisfactorily hard, requiring replacement.

While preferred embodiments of the invention have been described using specific terms, such description is for illustrative purposes only, and it is to be understood that changes and variations may be made without departing from the spirit or scope of the following claims.

What is claimed is:

1. A filler for an artificial turf, comprising:
   substantially round silicon dioxide beads (SiO$_2$) of a restricted size profile, the beads coated with an acrylic polymer coating so as to have a non-porous outer surface; and
   the coating including a color so as to achieve a desired aesthetic effect, the color being one of green and black.

2. The filler of claim 1 wherein the coated beads are at least one of environmentally safe, non-flammable, and dust free.

3. The filler of claim 1 wherein the coated beads resist mounding and present an angle of repose of about 30 degrees.

4. The filler of claim 1 wherein the coating provides an outer surface for the beads that is both water proof and slick.

5. The filler of claim 1 wherein the coated beads have a relatively hard outer surface such that, when the filler is incorporated into a turf, the turf retains a relatively constant G-max rating over extended use.

6. The filler of claim 1 wherein the coating includes chromium (III) oxide and the color is green.

7. A filler for an artificial turf, the filler comprising:
   substantially round silicon dioxide beads (SiO$_2$) of a restricted size profile, the beads coated with an acrylic polymer coating so as to have a non-porous outer surface; and
   the acrylic polymer coating including a natural color pigment of a selected color.

8. An artificial turf comprising:
   a base;
   a backing residing over the base and having pile tufts secured thereto and extending upwardly therefrom; and
   a filler located above the base and distributed among the upwardly extending pile tufts, the filler consisting essentially of the coated beads recited in claim 1.

9. The artificial turf of claim 8 wherein the coated beads have a relatively hard outer surface with a hardness in the range of at least six on the Mohs scale.

* * * * *

UNITED STATES PATENT AND TRADEMARK OFFICE
CERTIFICATE OF CORRECTION

PATENT NO. : 9,845,577 B2
APPLICATION NO. : 15/227517
DATED : December 19, 2017
INVENTOR(S) : Randolph S. Reddick Page 1 of 1

It is certified that error appears in the above-identified patent and that said Letters Patent is hereby corrected as shown below:

On the Title Page

Column 2, Abstract Lines 6-7, reads "... A filler of particles shaped to have no sharp edges and of substantially equal size are interspersed over ..." should read --... A filler of particles shaped to have no sharp edges and of substantially equal size is interspersed over ...--.

In the Specification

Column 3, Line approx. 8-9, reads "FIG. 5 is similar to FIG. 4 showing a second arrangement the artificial turf system ..." should read --FIG. 5 is similar to FIG. 4 showing a second arrangement of the artificial turf system ...--.

Column 4, Line approx. 15, reads "... height with the upper portion being bout ¾" and the lower ..." should read --... height with the upper portion being about 3/4" and the lower ...--.

Column 5, Line approx. 24-26, reads "It has been found that a filler of ..., coated to have a ..., are very desirable." should read --It has been found that a filler of ..., coated to have a ..., is very desirable.--.

Column 5, Line approx. 51-52, reads "... Desired colorants for coloring the silica sand is iron oxide (FeO2) for black and ..." should read --... Desired colorants for coloring the silica sand are iron oxide (FeO2) for black and ...--.

Column 5, Line approx. 57-58, reads "In order to prepare the ... with the silica sand the sealant, is first mixed with the clear ..." should read --In order to prepare the ... with the silica sand, the sealant is first mixed with the clear ...--.

Column 6, Line approx. 19, reads "... they do not produce dust, they are on-porous, they do not ..." should read --... they do not produce dust, they are non-porous, they do not--.

Signed and Sealed this
Twenty-fourth Day of July, 2018

Andrei Iancu
*Director of the United States Patent and Trademark Office*